(12) United States Patent
Yu et al.

(10) Patent No.: US 9,979,153 B2
(45) Date of Patent: May 22, 2018

(54) OPTICAL FIBER LASER DEVICE AND OPTICAL FIBER LASER PROVIDING METHOD

(71) Applicant: GWANGJU INSTITUTE OF SCIENCE AND TECHNOLOGY, Gwangju (KR)

(72) Inventors: Bong Ahn Yu, Gwangju (KR); Young Chul Noh, Gwangju (KR); Woo Jin Shin, Gwangju (KR); Chang soo Jung, Gwangju (KR); Yeung Lak Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days. days.

(21) Appl. No.: 15/307,896

(22) PCT Filed: Feb. 9, 2015

(86) PCT No.: PCT/KR2015/001267
§ 371 (c)(1),
(2) Date: Oct. 31, 2016

(87) PCT Pub. No.: WO2015/167115
PCT Pub. Date: Nov. 5, 2015

(65) Prior Publication Data
US 2017/0063019 A1     Mar. 2, 2017

(30) Foreign Application Priority Data

Apr. 30, 2014   (KR) .................. 10-2014-0052395

(51) Int. Cl.
*H01S 3/067*   (2006.01)
*H01S 3/10*    (2006.01)
(Continued)

(52) U.S. Cl.
CPC ...... *H01S 3/06754* (2013.01); *H01S 3/06758* (2013.01); *H01S 3/094096* (2013.01);
(Continued)

(58) Field of Classification Search
CPC ..... G02B 6/02; H01S 3/067; H01S 3/094096; H01S 3/1618
(Continued)

(56) References Cited

U.S. PATENT DOCUMENTS 7,764,720 B1 * 7/2010 Bronder .............. H01S 3/06754
                                                                372/3
8,462,426 B1 * 6/2013 Dajani ................ H01S 3/06754
                                                                359/334
(Continued)

FOREIGN PATENT DOCUMENTS

JP   2010-08642    *  4/2010   .......... B23K 26/073
JP   2010-80642 A     4/2010
(Continued)

OTHER PUBLICATIONS

Korean Office Action dated Nov. 30, 2015 for Korean Application No. 10-2014-0052395, total eight pages.
International Search Report dated May 15, 2015 corresponding to International Application No. PCT/KR2015/001267, total four pages.

*Primary Examiner* — Tuan Nguyen
(74) *Attorney, Agent, or Firm* — Hauptman Ham, LLP

(57) ABSTRACT

Disclosed herein is an optical fiber laser device including a seed unit for providing at least two seed lights having different wavelengths; and an amplifying unit for amplifying the at least two seed lights. The amplifying unit includes: a preamplifying unit for amplifying the at least two seed lights by using excitation light of which the wavelength is shorter than the wavelengths of the seed lights; and a final amplifying unit to which no separate excitation light source is provided. The final amplifying unit amplifies the seed light (Continued)

having the longest wavelength by using the other seed light as excitation light with respect to the seed light having the longest wavelength among the at least two seed light.

6 Claims, 5 Drawing Sheets

(51) Int. Cl.
  *H01S 3/094* (2006.01)
  *H01S 3/16* (2006.01)
  *H01S 3/23* (2006.01)

(52) U.S. Cl.
  CPC ........ *H01S 3/1618* (2013.01); *H01S 3/06762* (2013.01); *H01S 3/094003* (2013.01); *H01S 3/094053* (2013.01); *H01S 3/2391* (2013.01)

(58) Field of Classification Search
  USPC .............................................................. 372/6
  See application file for complete search history.

(56) References Cited

U.S. PATENT DOCUMENTS

| | | | | |
|---|---|---|---|---|
| 8,532,150 | B1* | 9/2013 | Tong ................... | H01S 3/06758 372/39 |
| 8,761,210 | B1 | 6/2014 | Henry et al. | |
| 2006/0222372 | A1* | 10/2006 | Spinelli ................. | H01S 3/1304 398/183 |
| 2010/0166026 | A1* | 7/2010 | Klebanov ............. | H01S 3/0675 372/6 |
| 2011/0038031 | A1* | 2/2011 | Starodoumov ..... | H01S 3/06754 359/326 |
| 2014/0071520 | A1* | 3/2014 | Armstrong ............ | H01S 3/2316 359/334 |
| 2015/0138630 | A1* | 5/2015 | Honea ................. | H01S 3/06758 359/341.3 |

FOREIGN PATENT DOCUMENTS

| | | | | |
|---|---|---|---|---|
| JP | 2012-044098 | * | 3/2012 | ............ H01S 3/00 |
| JP | 2012-44098 A | | 3/2012 | |
| JP | 2013-065655 | * | 4/2013 | ............ H01S 3/067 |
| JP | 2013-65655 A | | 4/2013 | |

* cited by examiner

OPTICAL FIBER LASER DEVICE AND OPTICAL FIBER LASER PROVIDING METHOD

CROSS REFERENCE TO RELATED APPLICATION

This application claims the priority of Korean Patent Application No. 10-2014-0052395, filed on Apr. 30, 2014 in the KIPO (Korean Intellectual Property Office). Further, this application is the National Phase application of International Application No. PCT/KR2015/001267 filed on Feb. 9, 2015, which designates the United States and was published in Korean.

TECHNICAL FIELD

The present disclosure relates to an optical fiber laser apparatus. Specifically, the present disclosure relates to an optical fiber laser apparatus capable of implementing high-power pulse laser and a method of providing optical fiber laser.

BACKGROUND ART

Laser apparatuses supply appropriate energy to a material such that electrons can release photons and generate laser light by using mirrors such that the photons pass through the material repeatedly. Such laser apparatus has continued to grow up according to background of the remarkable advance in the field of optical communication, increase of demand for industrial laser, growth of medical applications, etc. In recent years, optical fiber laser has been developed and utilized in various fields. The optical fiber laser is continuously expanding its application fields by virtue of its advantages such as excellent characteristics of laser beam, superior reliability and ease of maintenance.

On the other hand, it is demanded for pulsed laser having narrow line width, in order for light input to the laser apparatus to be output as light of a different wavelength through wavelength conversion. For example, in order to utilize the optical fiber laser as high quality laser within the ultraviolet region, which can be utilized as a light source for an ultra-fine laser process system, it is demanded for the pulsed fiber laser having narrow line width, which is efficient in wavelength conversion.

Photonic crystal fiber of which core size is several tens of µm or Large-Mode-Area Double Clad Fiber (hereinafter, it is referred to as "LMA DCF," or "double-clad optical fiber") is used as the optical fiber. The Photonic crystal fiber has an advantage of having excellent beam quality. However, it is not possible to configure high output all-fiber laser because connection between the optical fibers is difficult. On the contrary, since the LMA DCF allows connection between the optical fibers to be made easily by means of a large-diameter optical fiber connector, it is easy to make optical fiber laser in a form of all-fiber optical fiber. As for the structure of the LMA DCF, it is, in general, composed of a core of several tens of µm, an inner clad of several hundreds of µm, and an outer clad surrounding those components.

Optical fiber structure of the LMA DCF is now described. First, the core is doped with a rare earth metal and its numeric aperture (NA) is approximately 0.04 to 0.08. The inner clad serves to propagate excitation light and its NA is approximately 0.4 to 0.5. The outer clad may be made from acrylic material having a lower refractive index than the inner clad. By virtue of such structure, excitation light does not exit to the outside and propagates along the optical fiber while it is guided by the inner clad. At this time, excitation light propagating along the optical fiber is absorbed by the rare earth ion doped to the core and energy absorbed thereby can amplify the seed light.

As for the LMA DCF optical fiber, diameter of the inner clad corresponds to approximately 5 to 20 times that of the core. The excitation light being propagated through the inner clad is absorbed in the region where the inner clad is overlapped with the core over, i.e., the excitation light passes through the core. However, since the outside of the core is not doped, light absorption does not occur in the outside of the core. Therefore, when the excitation light is distributed in the inside of the inner clad, light absorbance of the excitation light per unit length is lowered compared to a case where the excitation light is forced to proceed into the core and thereby distributed only in the core. In this case, absorbance of the excitation light when the excitation light propagates through the core of the optical fiber is represented as "core absorbance," while absorbance of the excitation light when the excitation light propagates through the inner clad of the optical fiber is represented as "clad absorbance." The clad absorbance per unit length of the optical fiber may vary depending on the structure of individual optical fiber, but it is lowered substantially by a reciprocal number of area ratio compared to the core absorbance. For example, if the diameter of the inner clad is 5 to 20 times larger than the diameter of the core, the clad absorbance is lowered by approximately 25 to 400 times the area ratio.

In the LMA DCF optical fiber, there is a problem that if the length of laser medium is short, efficiency is lowered because the excitation light cannot be absorbed sufficiently, whereas if the length of laser medium is long, efficiency is lowered because signal light is rather absorbed. Taking into consideration of such problem, a typical optical fiber laser is generally designed such that 90% of the excitation light is absorbed.

In the optical fiber laser as discussed above, a method of amplifying low power seed beam to high output through an amplifier is generally used in order to obtain high power laser with high peak power.

In order to generate high power laser beam in the optical fiber laser, it is required to enlarge diameter of the optical fiber. However, if the diameter of the optical fiber is enlarged, there is a disadvantage that spatial mode of the laser beam is generated in a multimode, not in a single mode. Therefore, the size of the core of the optical fiber cannot be increased indefinitely in order to maintain quality of the output beam in a single mode, whereby the maximum output of the optical fiber laser is limited.

In order to generate effective laser beam in the optical fiber laser, it is required to adapt the length of the optical fiber so as to absorb the excitation light sufficiently. However, if the length of the optical fiber is lengthened in the high power optical fiber laser, output is restricted due to nonlinear phenomenon such as stimulated Brillouin scattering (SBS) and stimulated Raman scattering (SRS). In general, threshold value of light output of the SBS is given in the form as follows:

$$P_{th}^{SBS} = \frac{21 A_{SBS}}{g_{eff} L_{eff}}$$

Where, $A_{SBS}$ represents an effective cross-section area that optical fiber reacts with fiber laser beam, $g_{eff}$ represents an effective gain coefficient of the SBS, and $L_{eff}$ represents an effective length of optical fiber. Furthermore, threshold value of the SRS is given in the form as follows:

$$P_{th}^{SRS} - \frac{16A_R}{g_R L}$$

Where, $A_R$ represents an effective cross-section area, $g_R$ represents Raman gain coefficient, L represents length of optical fiber. Accordingly, in order to suppress generation of the SBS and SRS in the high power optical fiber laser, it is required to enlarge the cross-section area of the optical fiber as large as possible and reduce the length of the optical fiber. However, as already described, if the diameter of the core of the optical fiber is enlarged to 100 μm or more, there is a problem that a single mode cannot be generated, whereby quality of the laser is deteriorated.

As a way to obtain high power fiber laser while, if circumstances allow, reducing the length of the optical fiber and limiting the diameter of the optical fiber below a certain level, it is possible to contemplate a way to increase absorbance of the excitation light per unit light. In other words, it is possible to increase doping concentration of dopant ions in the optical fiber. However, since if the doping concentration becomes high, photodarkening effect or the like becomes strong, there is occurred a problem that using such optical fiber as laser gain medium is inappropriate.

In the LMA DCF optical fiber, as a way to obtain high output optical fiber laser under the condition that length and diameter of the optical fiber and concentration of dopant ions in the optical fiber are restricted, it is possible to contemplate a way to allow the excitation light to propagate to the core so as to enhance light absorbance in the optical fiber. This case requires a small light source allowing NA of the excitation light to be smaller than NA of the core of the optical fiber and an optical coupler for coupling excitation light and signal light together. However, since the NA of the output beam is in the range between 0.16 and 0.4 in an optical fiber-coupled type of a high output laser diode used as an excitation light source, of which output is 10 watts or more, it is not possible to couple the excitation light to the core so as to be guided in the core. Furthermore, in the LMA DCF, there is also a problem that it is not possible to use an optical coupler that can couple high power excitation light to signal light.

DISCLOSURE

Technical Problem

The present invention has been developed through repeated research by the inventor under the background as described above. It is an object of the present disclosure to provide an optical fiber laser apparatus and a method of providing optical fiber laser that enable to obtain high output fiber laser even under the condition that length and diameter of optical fiber and concentration of dopant ions in the optical fiber are limited.

Technical Solution

In accordance with one aspect of the present disclosure, an optical fiber laser apparatus comprises a seed unit for providing at least two seed lights having different wavelengths; and an amplifying unit for amplifying the at least two seed lights, wherein the amplifying unit includes a pre-amplifying unit for amplifying the at least two seed lights by means of excitation light having wavelength shorter than that of the seed lights, and a final amplifying unit for amplifying one seed light having the longest wavelength amongst the at least two seed lights by allowing the other seed light to serve as excitation light without providing a separate excitation light source. According to this, it is possible to obtain a high-power optical fiber laser apparatus.

In accordance with another aspect of the present disclosure, a method of providing optical fiber laser comprises: providing at least two seed lights having different wavelengths; pre-amplifying the at least two seed lights by means of excitation light of which wavelength is different from that of the at least two seed lights by utilizing a first amplifying optical fiber; finally amplifying the amplified seed light having the longest wavelength amongst the amplified at least two seed light by using the other amplified seed light having the shortest wavelength as excitation light by utilizing a second amplifying optical fiber; and emitting the amplified seed light after the final amplification. According to the present invention, it is possible to obtain a high peak power laser, even using the same optical fiber.

Advantageous Effects

According to the present invention, it is possible to obtain an optical fiber laser apparatus having high peak pulse power, even using the same optical fiber, by shortening the length of the optical fiber.

Furthermore, since it is possible to use an optical fiber of small diameter in spite that the optical fiber has high peak power and hence obtaining laser beam of a single mode is facilitated, it is possible to improve quality of laser beam.

BEST MODE

Specific embodiments of the present invention are now described in detail with reference to the accompanying drawings. However, technical ideas of the present invention are not restricted to the embodiments given hereinafter, and those of ordinary skill in the art understanding the technical ideas of the present invention can easily provide another embodiment to be made by supplementing, modifying, deleting and adding elements within the same scope of the technical ideas of the present invention, but such embodiment shall be also included in the scope of the technical ideas of the present invention.

Figure 1:
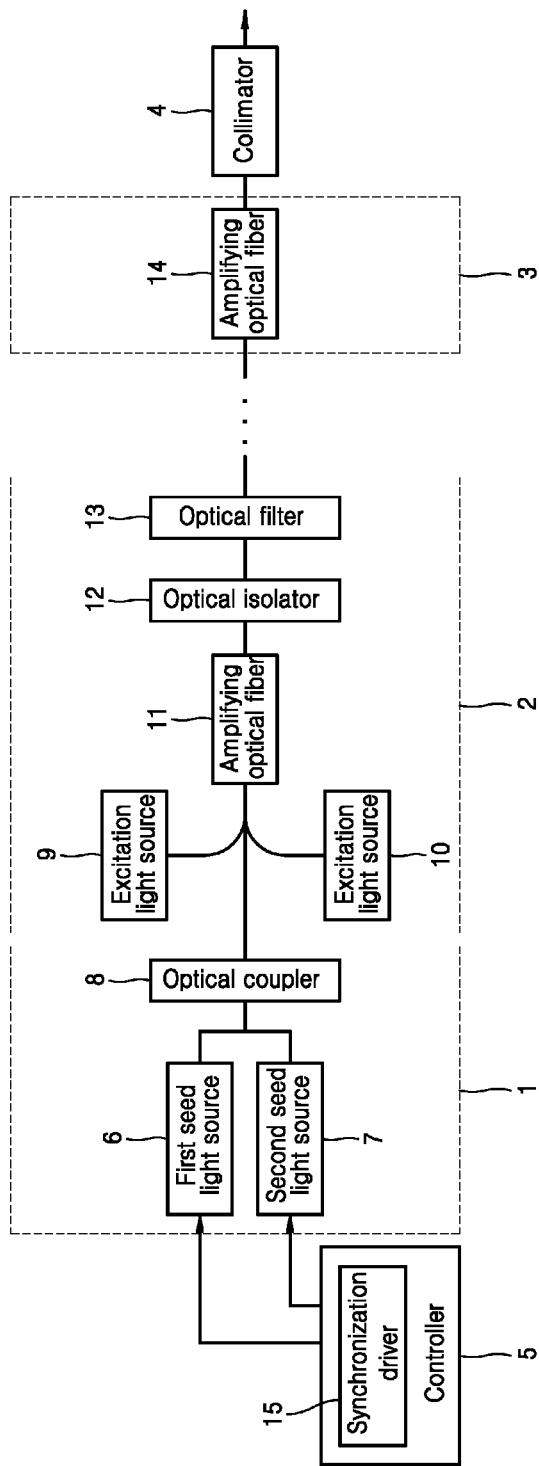
FIG. 1 is a schematic block diagram of an optical fiber laser apparatus for illustrating operation and principle of the present invention.

FIG. 1 shows a schematic block diagram of an optical fiber laser apparatus for illustrating operation and principle of the present invention.

Referring to FIG. 1, an optical fiber laser apparatus comprises: a seed unit 1 for providing at least two seed lights having different wavelengths, a pre-amplifying unit 2 for amplifying the at least two seed lights having different wavelengths, which are provided from the seed unit 1, by means of excitation light, a final amplifying unit 3 for amplifying and outputting one seed light amongst the at least two seed lights by using the other seed light as excitation light, a collimator 4 for irradiating parallel laser lights being emitted, and a controller 5 including at least a synchronization driver 15 to carry out function of synchronizing the at least two seed lights.

The seed unit 1 includes a first seed light source 6 for providing a first seed light of a first wavelength $\lambda_1$, a second seed light source 7 for providing a second seed light of a second wavelength $\lambda_2$, and an optical coupler 8 to couple light beams provided from the first and second seed light sources 6 and 7.

The pre-amplifying unit 2 includes excitation light sources 9 and 10 for providing excitation light of a third wavelength $\lambda_3$, amplifying optical fiber 11 for amplifying the seed light by means of the excitation light, and an optical isolator 12 for removing backward propagating light, and an optical filter 13 to perform optical filtering. The pre-amplifying unit 2 may be provided at least one or more and placed in series along light path. As for the relationship between the first wavelength and the second wavelength and the third wavelength, the first wavelength is the longest, the second wavelength is the next longest, and the third wavelength is the shortest. Such relationship between the wavelengths is considered to be equally applicable to the following description of the specification as well.

The final amplifying unit 3 is provided with amplifying optical fiber 14, and can amplify the first seed light having the first wavelength by using the second seed light having the second wavelength as excitation light. The final amplifying unit 3 may not be provided with a separate excitation light source.

The first seed light amplified in the final amplifying unit 3 passes through a collimator 4 and then it is emitted as parallel light to an object to be irradiated.

Operation of the optical fiber laser apparatus is now described in detail.

The first seed light irradiated from the first seed light source 6 may be provided as pulse having short pulse width, while the second seed light irradiated from the second seed light source 7 may be provided as continuous wave (CW) output. These seed lights are coupled in the optical coupler 8, and then amplified by the excitation light of the third wavelength in the amplifying optical fiber 11 at the pre-amplifying unit 2. A plurality of pre-amplifying units 2 may be provided in series to amplify the seed lights in succession.

On the other hand, the second seed light may be driven in pulse. For example, the second seed light may be driven in a longer pulse than the first seed light. In this case, the first seed light and the second seed light are preferably synchronized with each other by means of the synchronization driver 71. This is intended to ensure that output of the fiber laser apparatus is carried out effectively, wherein pulse width of the second seed light and lag time or lead time of the second seed light with respect to the first seed light may vary depending on the specific optical fiber laser apparatus.

In the final amplifying unit 3, the second seed light of the second wavelength is absorbed by the amplifying optical fiber 14 to serve as excitation light. The first seed light of the first wavelength is continued to be amplified by the amplifying optical fiber 14 and output.

Interaction between the first seed light and the second seed light and the excitation light is now described with reference to tables of energy level of laser medium in FIGS. 2 and 3.

Figure 2:
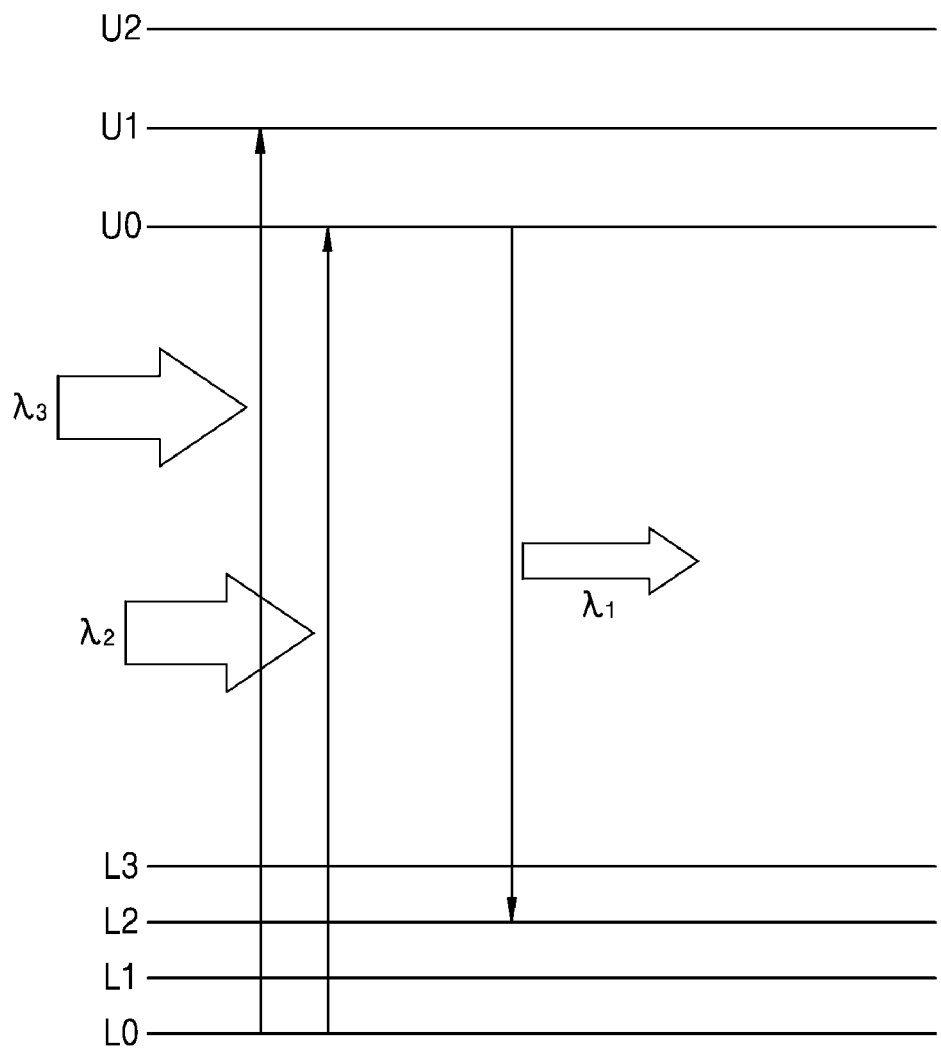
FIGS. 2 and 3 are diagrams showing a table of energy level of laser medium having a variety of energy levels.
Figure 3:
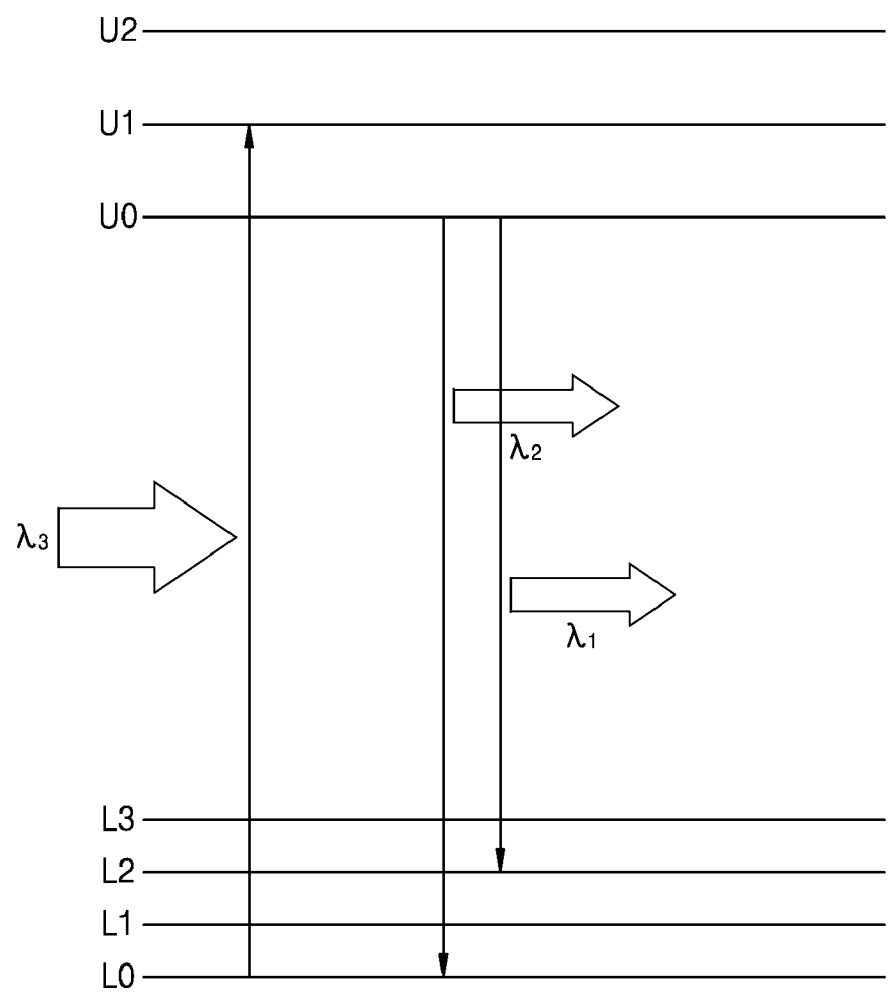

FIGS. 2 and 3 are diagrams showing a table of energy level of laser medium having a variety of energy levels. Referring to FIGS. 2 and 3, it is possible to make a variety of combinations of absorption wavelength and generation wavelength depending on generation wavelength or absorption wavelength of dopants. In general, wavelength having high absorbance is selected to enter as excitation light, and laser signal light is generated in the wavelength region where absorption scarcely occurs (see FIG. 2). If the laser is generated in the region where absorption occurs, efficiency of the laser is deteriorated due to reabsorption. However, in case of sufficiently enlarging distribution of high level with strong excitation light, it is possible to generate laser signal even in the region where absorption occurs (see FIG. 3).

In the figures, $\lambda_1$ (i.e., first wavelength) may be a generation wavelength where absorption scarcely occurs, while $\lambda_2$ (i.e., second wavelength) and $\lambda_3$ (i.e., third wavelength) corresponds to a wavelength band where absorption occurs. However, in case of enlarging distribution of high level by forcing considerably strong excitation light having wavelength of $\lambda_3$ to enter into laser medium, as can be seen in FIG. 3, wavelength of $\lambda_1$ as well as wavelength of $\lambda_2$ can be generated.

This embodiment utilizing this method uses excitation light having the third wavelength, wherein when two seed lights of the first wavelength and the second wavelength are allowed to enter, the two seed lights are amplified and output respectively. Efficiency of amplification may vary depending on intensity of the excitation light as well as intensity of each of the seed lights. In general, the first seed light of the first wavelength falling within the wavelength band where no absorption occurs is mainly amplified.

Under this background, when the first seed light is operated in short pulse and the second seed light enters as continuous wave output, only the second seed light is amplified during no incidence of optical signal of the first seed light, whereas signals of the two wavelengths are amplified at the same time depending on amplification efficiency of each of the wavelengths during the time period of incidence of signal of the first seed light. Amplification efficiency of the two seed lights may vary depending on pulse width and gain efficiency of each of the seed lights.

The amplification efficiency of the two seed lights is now described in detail. When optical signals of the first seed light in a form of pulse and the second seed light of the continuous wave output are coupled to the amplifying optical fiber 11 of the pre-amplifying unit 2 for exciting the seed lights with the excitation light of the continuous wave output, and then amplified together, the first seed light is amplified only for the time when the pulse is continued and the second seed light of the continuous wave output is continuously amplified, as far as amplification factors according to each wavelength do not differ greatly. Therefore, if the pulse width of the optical signal of the first seed light is tp, the pulse period is T, and T»tp because the pulse period T is considerably less than the saturation time of the laser medium, energy ratio per unit time of the optical signal to be amplified (i.e., energy of the optical signal of the first wavelength:energy of the optical signal of the second wavelength) becomes approximately tp:T. For example, if the pulse width is 10 ns and the pulse period is 10 us, energies per unit time depending on the wavelengths differ by approximately 1000 times. The output energy per unit time according to the wavelengths may vary depending on the amplification factor according to each wavelength and the intensity of the incident light of each wavelength in the specific laser system, but it can be represented in a form of being substantially proportional to duty ratio of the pulse. That is, it can be represented in a form of being proportional to tp:T.

When output lights amplified in the pre-amplifying unit 2 enters into the amplifying optical fiber 14 of the final amplifying unit 3 without excitation light, the optical signal of the second wavelength of the seed light is absorbed in the medium and serves as the excitation light, whereas the optical signal of the first wavelength is amplified continuously and output.

In the amplifying optical fiber 3 of the final amplifying part 3, the optical signal of the second wavelength proceeds to the core of the optical fiber. Specifically, the optical signal of the second wavelength serving as the excitation light in the final amplifying unit 3 generates in the core of the optical fiber. Since NA of the generated laser beam of the second wavelength is identical with NA of the core, a separate optical coupler is not required. Therefore, when the optical signal of the second wavelength enters into the final amplifying unit 3 which does not have separate excitation light, it may serve as excitation light working in a manner of exciting a core. The manner of exciting a core, which is the case of allowing the excitation light to be propagated into the core of the optical fiber, makes it possible to obtain core absorbance (which is opposed to clad absorbance in case of allowing excitation light to be propagated into the inner clad and enables to obtain high optical absorbance). Therefore, since absorbance per unit length in the manner of exciting a core is higher than that in the manner of exciting a clad, which provides the clad absorbance, sufficient absorption can be obtained with a shorter length of the optical fiber and it is possible to further increase the peak power of the optical signal of the first wavelength.

Figure 4:
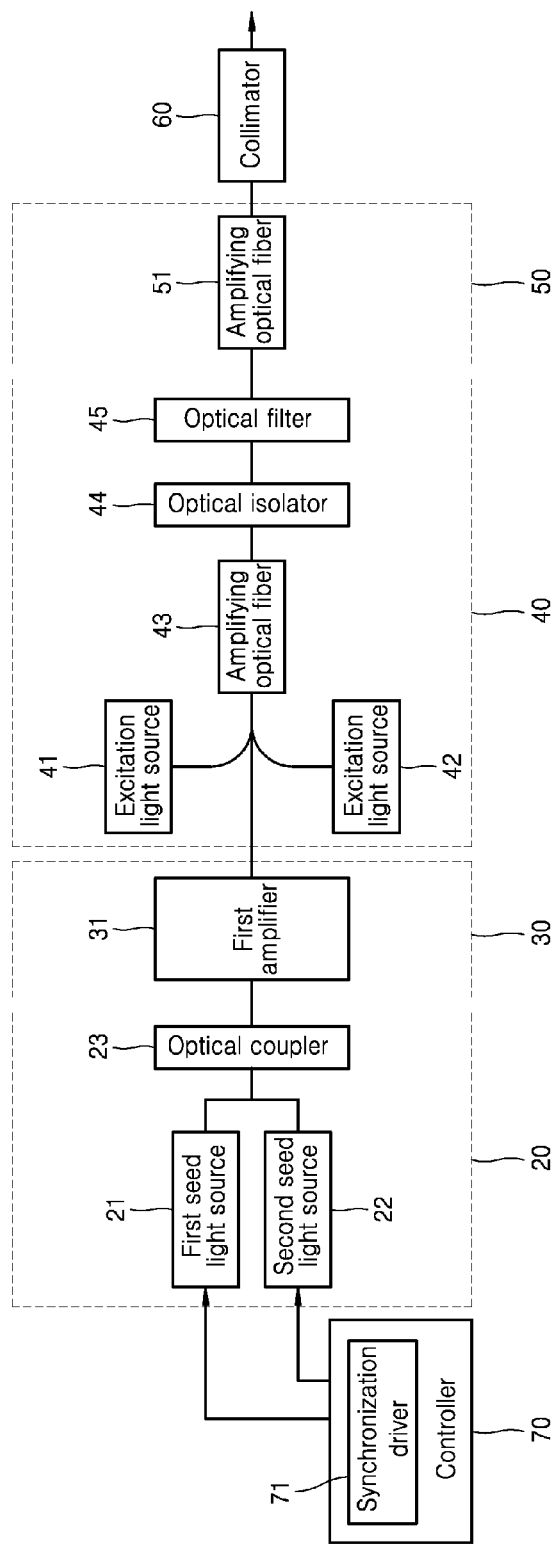
FIG. 4 is a block diagram of an optical fiber laser apparatus according to an embodiment of the present invention.

FIG. 4 shows a block diagram of an optical fiber laser apparatus according to an embodiment of the present invention. As for any section without specific description in the description of this embodiment, it is intended that description given for the configuration of FIG. 1 that describes the principle of the present invention is applied therefor as it is.

Referring to FIG. 4, an optical fiber laser apparatus comprises: a seed unit 20 for providing a first seed light of a first wavelength and a second seed light of a second wavelength, the first and second wavelengths being different from each other; a first pre-amplifying unit 30 and a second pre-amplifying unit 40 for amplifying the two seed lights provided from the seed unit 20; a final amplifying unit 50 for amplifying and outputting an optical signal of the first wavelength amongst optical signals of the first and second wavelengths amplified in the pre-amplifying units 30, 40 by using the optical signal of the second wavelength as excitation light; a collimator 60 for irradiating parallel laser lights being emitted; and a controller 70 including at least a synchronization driver 71 for synchronizing the two seed lights.

The seed unit 1 includes a first seed light source 21 for providing a first seed light of a first wavelength $\lambda_1$, a second seed light source 22 for providing a second seed light of a second wavelength $\lambda_2$, and an optical coupler 23 to couple light beams provided from the first and second seed light sources 21, 22. The first seed light source 21 and the second seed light source 22 may be configured by a laser diodes or a laser resonator. Further, each of the first seed light source 21 and the second seed light source 22 may comprise an amplifier.

The pre-amplifying unit 40 includes excitation light sources 41, 42 for providing excitation light of a third wavelength $\lambda_3$, amplifying optical fiber 43 for amplifying the seed light by means of the excitation light, and an optical isolator 44 for removing backward propagating light, and an optical filter 45 to perform optical filtering.

The final amplifying unit 50 is provided with amplifying optical fiber 51, and can amplify the optical signal of the first wavelength by using the optical signal of the second wavelength as excitation light. The final amplifying unit 50 is not provided with a separate excitation light source. The first seed light amplified in the final amplifying unit 50 passes through a collimator 60 and then it is emitted as parallel light.

The first pre-amplifying unit 30 may be configured by a single-mode optical fiber to amplify the seed light with low output in a manner of exciting a core. Optical fiber of the second pre-amplifying unit 40 and the final amplifying unit 50 may be configured by LMA DCF having core diameter of 25 um and inner clad diameter of 250 um. The second pre-amplifying unit 40 can carry out amplification in a manner of exciting a clad, while the final amplifying unit 50 may amplify output light in a manner of exciting a core. In this case, length of the amplifying optical fiber 43 of the pre-amplifying unit 40 may be configured to be in the order of a few meters (m), while length of the amplifying optical fiber 51 of the final amplifying unit 50 may be configured to be in the order of several tens of centimeters (cm).

Operation of the optical fiber laser apparatus according to this embodiment is now described in detail.

Ytterbium (Yb) is doped to the amplifying optical fibers 43, 51, wherein Yb optical fiber laser is typically an optical fiber laser that outputs wavelength in a band of 1030 nm to 1100 nm. In general, excitation light having wavelength in a band of 915 nm to 940 nm and in a band of 970 nm to 985 nm can be used. Preferably, the wavelengths of the seed lights may be 1030 nm to 1080 nm and 970 nm to 985 nm respectively and the wavelength of the excitation light may be 915 nm to 940 nm. In this embodiment, wavelength using in the first wavelength of the first seed light source 21 is 1064 nm and wavelength using in the second wavelength of the second seed light source 22 is 976 nm. Wavelength using in the third wavelength of the excitation light is 915 nm. Furthermore, the first seed light of the first seed light source is driven in pulse, the second seed light of the second seed light source is driven in continuous wave output, and the excitation light is driven in continuous wave output.

The two seed lights are coupled together and then input to the first pre-amplifying unit 30, and the first seed light and the second seed light are amplified in accordance with the respective amplification factor in the first amplifier 31 consisting of a single-mode optical fiber. As already discussed, since the energy ratio per unit time of the first seed light in a form of pulse and the second seed light in a form of continuous wave output is represented in a form of being substantially proportional to the pulse operating ratio of the first seed light, signal of wavelength of 976 nm in the form of continuous wave output has much larger energy. The output of the single-mode optical fiber is amplified to much higher output in the second pre-amplifying unit 40 consisting of LMA DCF in the manner of exciting a clad.

The output optical signals of the pre-amplifying units 30, 40 enter into the final amplifying unit 50 which does not have the excitation light. The optical signal of 976 nm (i.e., second wavelength) amplified in the pre-amplifying units 30, 40 is absorbed in the final amplifying unit 50, while the optical signal of 1064 nm (i.e., first wavelength) is amplified continuously and then output through the collimator 60.

In a typical optical fiber laser, when a final amplifier is configured to be several tens of meters in its length from amplifying optical fiber having a core diameter of 25 μm, if the peak power becomes high, optical signal having a pulse width of about 10 ns and a wavelength width of about 0.1 nm may cause damage to the laser system due to non-linear phenomenon as described above. Therefore, the peak power of the optical signal is limited to approximately several tens of kilowatts (kW). In contrast, in this present embodiment, even when the peak power of the optical signal of the first wavelength is amplified only to approximately few kilowatts in the pre-amplifying unit, the energy per unit time becomes large and the peak power is output in a low form because the optical signal of the second wavelength is driven in continuous wave output or long pulse, and therefore a problem due to the non-linear phenomenon does not occur. In addition, since the amplifying optical fiber 51 of the final amplifying unit 50 is several tens of centimeters in its length, it is possible to amplify the peak output of the light pulse of the first wavelength to the order of several hundreds of kilowatts without non-linear effect.

It is noted that length of the amplifying optical fiber 51 in the final amplifying unit 50 can be shortened because it is possible to amplify optical absorption output light of the excitation light in a manner of exciting a core and thereby obtain core absorbance. In this case, the reason that the manner of exciting a core is available is because NA of laser beam of the optical signal of the second wavelength, which serves as the excitation light, is identical with NA of the core as already discussed. In this case, it is sufficient if the length of the amplifying optical fiber 51 is ½ to $\frac{1}{400}$ of the length of amplifying optical fiber having clad absorbance of 90%, provided that other conditions are the same.

In this embodiment, it can be seen that the optical signal of the second wavelength (wavelength of the second seed light) amplified by the excitation light of the third wavelength is used as the excitation light in the amplifying optical fiber 51 of the final amplifying unit 50. In this embodiment, the optical signal of the first wavelength is subjected to at least two steps of amplification process. In other words, the optical signal of the first wavelength is amplified primarily to a lower peak power compared to the core size without nonlinear phenomenon in the pre-amplifying units 30, 40, and then it is amplified secondarily to the order of several hundreds of kilowatts without nonlinear phenomenon by virtue of short length of several tens of centimeters of the amplifying optical fiber 51 of the final amplifying unit 50. The reason that the length of the amplifying optical fiber 51 can be shortened as above is because effect of exciting a core can be obtained in the present invention, as previously described.

According to this two steps of amplification, although overall efficiency of amplification may be somewhat lowered compared to other optical fiber laser apparatuses, there is an effect that high peak power can be obtained by using optical fiber having the same size of the core.

The present invention is not limited to the optical fiber laser apparatus according to the embodiments described above, and may further comprise a variety of configurations. Another embodiment falling within the scope of the same technical idea of the present invention is now provided in the following.

First, wavelength of the seed light and wavelength of the excitation light presented in the embodiments described above does not restrict those set forth in this embodiment. For example, referring to the table of energy level of Yb-doped optical fiber, wavelength selected for the excitation light is a short wavelength where absorption occurs; wavelength selected for the second seed light is a wavelength where absorption occurs but laser amplification of a different wavelength can be made by exciting the wavelength in question strongly by means of excitation light on the different wavelength; and wavelength selected for the first seed light is a final pulsed output wavelength. In some cases, it is possible to provide two or more seed lights and then amplify each light, and allow wavelength of one seed light among the lights to serve as excitation light against wavelength of the other seed light(s) providing output wavelength.

In another embodiment, optical fiber is not limited to the Yb-doped optical fiber and it is of course to use other optical fiber to which another dopant such as Nd, Er, or Tm is doped. Furthermore, amplifying optical fibers to which different kinds of ions are doped respectively can be used differently for each and every amplifying unit in the optical fiber laser apparatus. In this case, operation of the optical fiber laser apparatus can be achieved by making output wavelength of the pre-amplifying unit identical with absorption wavelength of the final amplifying unit.

Figure 5:
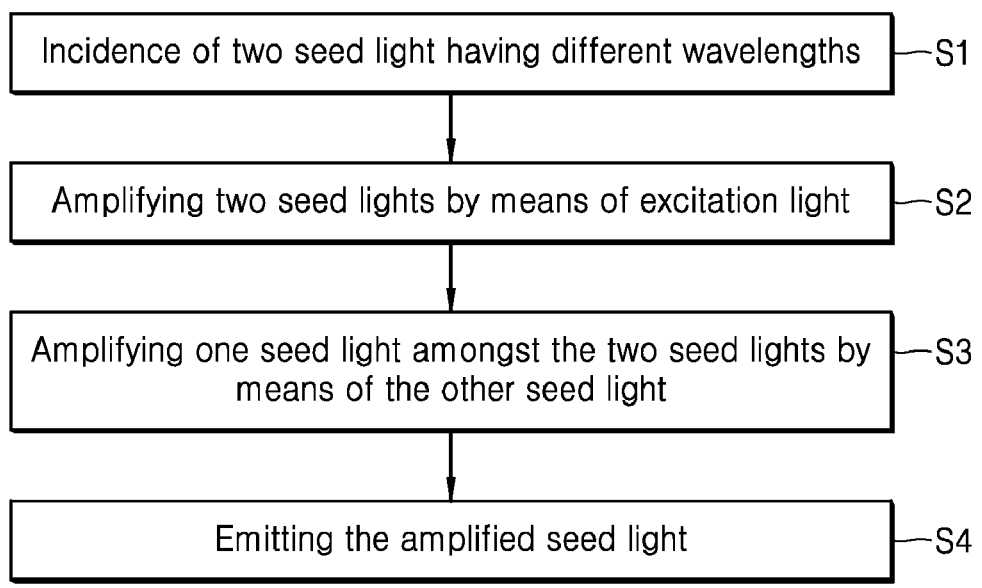
FIG. 5 is a flow chart of a method of providing optical fiber laser according to an embodiment of the present invention.

FIG. 5 shows a flow chart of a method of providing optical fiber laser according to an embodiment of the present invention.

Referring to FIG. 5, at least two seed lights having different wavelengths are provided at S1. In this case, one of the at least two seed lights may become an output wavelength. The at least two seed lights are then amplified by means of excitation light of which wavelength is different from that of the seed lights at S2. In this case, the wavelength of excitation light is preferably shorter than the wavelength of the two seed lights. Subsequently, the amplified seed light having the longest wavelength amongst the amplified at least two seed lights is amplified again by using as excitation light the amplified seed light having a shorter wavelength amongst the amplified at least two seed lights at S3. The seed light amplified at two steps is emitted at S4.

According to the method of providing optical fiber laser, it is possible to provide optical fiber laser having high peak power without damage to the laser apparatus.

The invention claimed is:

1. An optical fiber laser apparatus comprising:
   a seed unit configured to provide at least two seed lights, wherein the at least two seed lights comprise:
      a first seed light having a first wavelength, wherein an optical signal of the first seed light is in a form of a pulse having time periods of no incidence of the optical signal and incidence of the optical signal; and
      a second seed light having a second wavelength, wherein an optical signal of the second seed light is in a form of a continuous wave output having time period of incidence of the optical signal;
   a pre-amplifying unit comprising an excitation light source and a first amplifying optical fiber, wherein
      the excitation light source is configured to provide an pre-amplifying excitation light having a third wavelength,
      the third wavelength is shorter than the first wavelength and the second wavelength, and
      the pre-amplifying unit is further configured to amplify the first seed light and the second seed light at the same time during time period of incidence of the optical signal of the first seed light and amplify the second seed light during time period of no incidence of the optical signal of the first seed light using the pre-amplifying excitation light as an excitation light;

an amplifying unit comprising a second amplifying optical fiber, wherein the amplifying unit is configured to amplify the first seed light using the optical signal of the amplified second seed light as an excitation light; and a controller comprising at least a synchronization driver configured to synchronize the at least two seed lights, wherein the first amplifying optical fiber is configured to carry out amplification in a manner of exciting a clad and the second amplifying optical fiber is configured to carry out amplification in a manner of exciting a core.

2. The optical fiber laser apparatus of claim 1, wherein the amplifying unit comprises an amplifying optical fiber comprising an Large-Mode-Area Double Clad Fiber (LMA DCF), and wherein the amplifying unit is configured to amplify the first seed light in the amplifying optical fiber.

3. The optical fiber laser apparatus of claim 1, wherein the seed unit is configured to provide two seed lights, wherein pre-amplifying unit or the amplifying unit comprises an amplifying optical fiber, the amplifying optical fiber is doped with Ytterbium (Yb), wherein the first wavelength ranges from 1030 nm to 1080 nm, and the second wavelength ranges from 915 nm to 940 nm.

4. The optical fiber laser apparatus of claim 1, wherein the at least two seed lights comprise a third seed light, and wherein an optical signal of the third seed light is a form of a continuous wave output.

5. The optical fiber laser apparatus of claim 1, wherein the pre-amplifying unit and the amplifying unit are provided with amplifying optical fiber, both the amplifying optical fibers are doped with the identical or different rare earth elements, and the rare earth element comprises at least one of Yb, Nd, Er and Tm.

6. A method of providing optical fiber laser comprising:
providing, by a seed unit, at least two seed lights having different wavelengths, wherein the at least two seed light comprise:
a first seed light having a first wavelength, wherein an optical signal of the first seed light is in a form of a pulse having time periods of no incidence of the optical signal and incidence of the optical signal; and
a second seed light having a second wavelength, wherein an optical signal of the second seed light is in a form of a continuous wave output having time period of incidence of the optical signal, wherein the second seed light has a wavelength shorter than a wavelength of the first seed light;
synchronizing, by a controller comprising at least a synchronization driver, the at least two seed lights;
pre-amplifying, by a pre-amplifying unit, the at least two seed lights from the seed unit at the same time during time period of incidence of the optical signal of the first seed light and amplify the second seed light during time period of no incidence of the optical signal of the first seed light by means of excitation light of which wavelength is different from that of the at least two seed lights by utilizing a first amplifying optical fiber;
amplifying, by an amplifying unit, the first seed light using the optical signal of the amplified second seed light in a second amplifying optical fiber; and
emitting the amplified first seed light,
wherein the first amplifying optical fiber carries out amplification in a manner of exciting a clad and the second amplifying optical fiber carries out amplification in a manner of exciting a core.

* * * * *